(12) United States Patent
Cho et al.

(10) Patent No.: US 10,747,064 B2
(45) Date of Patent: Aug. 18, 2020

(54) LIQUID CRYSTAL DISPLAY DEVICE

(71) Applicant: LG Display Co., Ltd., Seoul (KR)

(72) Inventors: HyunGoog Cho, Gumi-si (KR);
KyungTae Park, Gumi-si (KR);
Donghoon Ha, Gumi-si (KR)

(73) Assignee: LG Display Co., Ltd., Seoul (KR)

(*) Notice: Subject to any disclaimer, the term of this patent is extended or adjusted under 35 U.S.C. 154(b) by 0 days.

(21) Appl. No.: 15/798,498

(22) Filed: Oct. 31, 2017

(65) Prior Publication Data
US 2018/0120619 A1     May 3, 2018

(30) Foreign Application Priority Data
Oct. 31, 2016   (KR) ........................ 10-2016-0143770

(51) Int. Cl.
*G02F 1/1339*    (2006.01)
*G02F 1/1362*    (2006.01)
*G02F 1/1368*    (2006.01)
*G02F 1/1337*    (2006.01)
(Continued)

(52) U.S. Cl.
CPC ........ *G02F 1/13394* (2013.01); *G02F 1/1368* (2013.01); *G02F 1/136286* (2013.01); *G02F 1/1337* (2013.01); *G02F 1/136227* (2013.01); *G02F 2001/13398* (2013.01); *G02F 2001/133357* (2013.01);
(Continued)

(58) Field of Classification Search
CPC .............. G02F 1/13394; G02F 1/1337; G02F 1/136286; G02F 1/1368; G02F 1/136227; G02F 2001/134372; G02F 2001/133357; G02F 2001/13398; G02F 2201/503; G02F 2201/121; G02F 2201/123

USPC .......................................................... 349/46
See application file for complete search history.

(56) References Cited

U.S. PATENT DOCUMENTS

2007/0139604 A1   6/2007   Paik et al.
2009/0244457 A1   10/2009  Onishi et al.
(Continued)

FOREIGN PATENT DOCUMENTS

CN          1982967 A     6/2007
CN          101676777 A   4/2009
CN          101676777 A   3/2010
(Continued)

OTHER PUBLICATIONS

Office Action dated May 29, 2020 issued in corresponding Chinese Patent Application No. 201710948833.4 (11 pages).

*Primary Examiner* — Nathanael R Briggs
*Assistant Examiner* — William D Peterson
(74) *Attorney, Agent, or Firm* — Polsinelli PC (57) ABSTRACT

A liquid crystal display (LCD) device is disclosed, which comprises a first substrate and a second substrate; a pixel electrode provided in each of the plurality of pixels on the first substrate; a common electrode provided on the first substrate; an auxiliary line connected to the common electrode; a column spacer provided between the first substrate and the second substrate; and moving stopper walls provided on the first substrate to restrict a moving range of the column spacer and spaced apart from the auxiliary line. As a moving range of the column spacer may be restricted by the moving stopper walls, an alignment direction of a liquid crystal layer is not changed by movement of the column spacer, whereby a spot defect of the LCD device may be avoided.

20 Claims, 5 Drawing Sheets

(51) Int. Cl.
*G02F 1/1343* (2006.01)
*G02F 1/1333* (2006.01)

(52) U.S. Cl.
CPC ............ *G02F 2001/134372* (2013.01); *G02F 2201/121* (2013.01); *G02F 2201/123* (2013.01); *G02F 2201/503* (2013.01)

(56) References Cited

U.S. PATENT DOCUMENTS

2015/0098048 A1* 4/2015 Tomioka ........... G02F 1/133512
 349/106
2015/0253607 A1* 9/2015 Cho .................... G02F 1/13394
 349/110

FOREIGN PATENT DOCUMENTS

JP 2004279812 A 10/2004
JP 2007-164129 A 6/2007

* cited by examiner

LIQUID CRYSTAL DISPLAY DEVICE

CROSS REFERENCE TO RELATED APPLICATION

This application claims the benefit of the Korean Patent Application No. 10-2016-0143770 filed on Oct. 31, 2016, which is hereby incorporated by reference in its entirety for all purposes as if fully set forth herein.

BACKGROUND

Field of the Disclosure

The present disclosure relates to a liquid crystal display device, and more particularly, to a column spacer for maintaining a cell gap of a liquid crystal display device.

Description of the Background

A liquid crystal display (LCD) device is advantageous in that it enables low power consumption owing to a low operation voltage and portability. Due to these advantages, the LCD device has been widely used in various fields, for example, notebook computer, monitor, spacecraft, aircraft, and etc.

The LCD device includes a lower substrate provided with a thin film transistor, an upper substrate provided with a color filter, and a liquid crystal layer formed between the lower and upper substrates. Also, a column spacer is formed between the lower substrate and the upper substrate to maintain a cell gap between the lower substrate and the upper substrate.

Hereinafter, an LCD device of the related art will be described with reference to the accompanying drawing.

Figure 1:
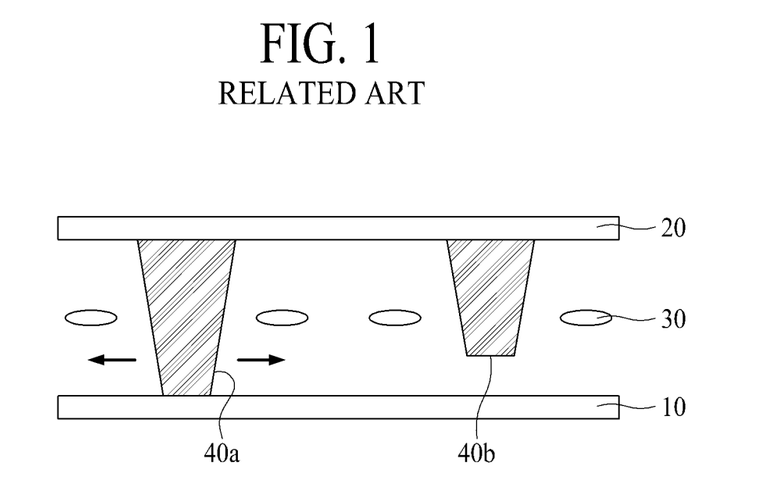
FIG. 1 is a cross-sectional view illustrating an LCD device of the related art.

FIG. 1 is a cross-sectional view illustrating an LCD of the related art.

As shown in FIG. 1, the LCD device of the related art includes a lower substrate 10, an upper substrate 20, a liquid crystal layer 30, and column spacers 40a and 40b.

Although not shown, a thin film transistor and a pixel electrode are formed on the lower substrate 10, and a color filter is formed on the upper substrate 20.

The liquid crystal layer 30 is formed between the lower substrate 10 and the upper substrate 20.

The column spacers 40a and 40b are formed between the lower substrate 10 and the upper substrate 20 to maintain a cell gap between the lower substrate 10 and the upper substrate 20.

The column spacers 40a and 40b include a main column spacer 40a and an auxiliary column spacer 40b.

The main column spacer 40a is in contact with each of the lower substrate 10 and the upper substrate 20, and the auxiliary column spacer 40b is in contact with the upper substrate 20 only. The main column spacer 40a is formed to have the height of a cell gap, whereas the auxiliary column spacer 40b is formed to have the height lower than the cell gap.

To manufacture the LCD device, the amount of liquid crystal molecules constituting the liquid crystal layer 30 is determined by considering a cell gap. It may be difficult to determine the exact amount of liquid crystal molecules, whereby the liquid crystal layer 30 can be filled with the liquid crystal molecules insufficiently or overfilled with the liquid crystal molecules.

Since the auxiliary column spacer 40b is formed with the height lower than the cell gap, when the liquid crystal layer 30 is filled with the liquid crystals insufficiently or overfilled with the liquid crystal molecules, the auxiliary column spacer 40b can control the cell gap more effectively. Also, the auxiliary column spacer 40b serves to work with the main column spacer 40a to prevent the cell gap from being damaged when an external force is applied to the LCD device.

As described above, the LCD device of the related art has problems as follows.

The column spacers 40a and 40b are fixed to the upper substrate 20, but not fixed to the lower substrate 10. Therefore, when the external force is applied to the LCD device, the column spacers 40a and 40b move by means of the external force, whereby alignment of the liquid crystal layer 30 can be damaged by the movement of the column spacers 40a and 40b. As a result, an alignment direction of the liquid crystal layer 30 cannot be controlled, whereby a problem such as a spot defect can be generated.

SUMMARY OF THE DISCLOSURE

Accordingly, the present disclosure is directed to a liquid crystal display (LCD) device that substantially obviates one or more problems due to limitations and disadvantages of the related art.

An advantage of the present disclosure is to provide a liquid crystal display (LCD) device in which a moving range of a column spacer is restricted so as not to change an alignment direction of a liquid crystal layer when the column spacer moves by means of an external force, whereby a spot defect may be avoided.

Additional advantages and features of the disclosure will be set forth in part in the description which follows and in part will become apparent to those having ordinary skill in the art upon examination of the following or may be learned from practice of the disclosure. Other advantages of the disclosure may be realized and attained by the structure particularly pointed out in the written description and claims hereof as well as the appended drawings.

To achieve other advantages and in accordance with the purpose of the disclosure, as embodied and broadly described herein, there is provided a liquid crystal display (LCD) device comprising a first substrate and a second substrate; a pixel electrode provided in each of the plurality of pixels on the first substrate; a common electrode provided on the first substrate; an auxiliary line connected to the common electrode; a column spacer provided between the first substrate and the second substrate; and moving stopper walls provided on the first substrate to restrict a moving range of the column spacer and spaced apart from the auxiliary line.

In another aspect of the present disclosure, a liquid display device includes first and second substrates facing each other; a thin film transistor on the first substrate; a planarization layer over the first substrate including the thin film transistor, the planarization layer having a contact hole; a common electrode on planarization layer and having a disconnected portion at the contact hole of the planarization layer; an auxiliary line on the common electrode reducing an electrical resistance of the common electrode; a pixel electrode in the contact hole of the planarization layer, the pixel electrode spaced apart from the common electrode; a column spacer between the first substrate and the second substrate maintaining a cell gap; and first and second column spacer moving stopper walls in parallel with each other on the common electrode and preventing damage on an alignment direction of liquid crystal molecules.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate aspect(s) of the disclosure and together with the description serve to explain the principle of the disclosure.

In the drawings.

DETAILED DESCRIPTION OF THE DISCLOSURE

Reference will now be made in detail to the exemplary aspects of the present disclosure, examples of which are illustrated in the accompanying drawings. Wherever possible, the same reference numbers will be used throughout the drawings to refer to the same or like parts.

Advantages and features of the present disclosure, and implementation methods thereof will be clarified through following aspects described with reference to the accompanying drawings. The present disclosure may, however, be embodied in different forms and should not be construed as limited to the aspects set forth herein. Rather, these aspects are provided so that this disclosure will be thorough and complete, and will fully convey the scope of the present disclosure to those skilled in the art. Further, the present disclosure is only defined by scopes of claims.

A shape, a size, a ratio, an angle, and a number disclosed in the drawings for describing aspects of the present disclosure are merely an example, and thus, the present disclosure is not limited to the illustrated details. Like reference numerals refer to like elements throughout. In the following description, when the detailed description of the relevant known function or configuration is determined to unnecessarily obscure the important point of the present disclosure, the detailed description will be omitted. In a case where 'comprise', 'have', and 'include' described in the present specification are used, another part may be added unless 'only~' is used. The terms of a singular form may include plural forms unless referred to the contrary.

In construing an element, the element is construed as including an error range although there is no explicit description.

In describing a position relationship, for example, when the position relationship is described as 'upon~', 'above~', 'below~', and 'next to~', one or more portions may be arranged between two other portions unless 'just' or 'direct' is used.

In describing a time relationship, for example, when the temporal order is described as 'after~', 'subsequent~', 'next~', and 'before~', a case which is not continuous may be included unless 'just' or 'direct' is used.

It will be understood that, although the terms "first", "second", etc. may be used herein to describe various elements, these elements should not be limited by these terms. These terms are only used to distinguish one element from another element. Therefore, a first element could be termed a second element within the technical spirits of the present disclosure.

Features of various aspects of the present disclosure may be partially or overall coupled to or combined with each other, and may be variously inter-operated with each other and driven technically as those skilled in the art can sufficiently understand. The aspects of the present disclosure may be carried out independently from each other, or may be carried out together in co-dependent relationship.

Hereinafter, the aspects of the present disclosure will be described in detail with reference to the accompanying drawings.

Figure 2:
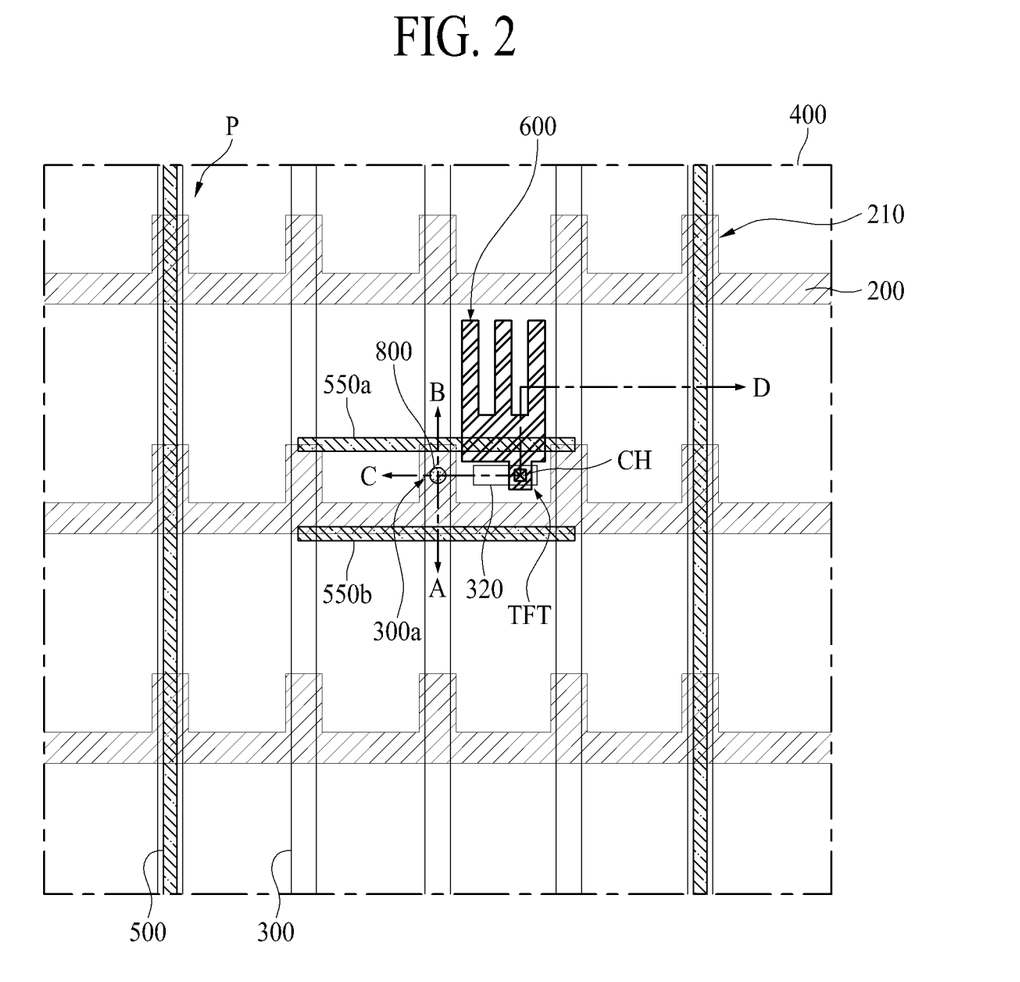
FIG. 2 is a plane view illustrating an LCD device according to an aspect of the present disclosure.

FIG. 2 is a plane view illustrating an LCD device according to an aspect of the present disclosure.

As shown in FIG. 2, the LCD device according to an aspect of the present disclosure includes a gate line 200, a data line 300, a thin film transistor TFT, a common electrode 400, an auxiliary line 500, moving stopper walls 550a and 550b, a pixel electrode 600, and a column spacer 800. For convenience, the thin film transistor TFT and the pixel electrode 600 are illustrated in only one pixel P.

The gate line 200 is arranged in a first direction, for example, a horizontal direction, and the data line 300 is arranged in a second direction different from the first direction, for example, a vertical direction. The gate line 200 and the data line 300 are arranged to cross each other, whereby a plurality of pixels P are defined. Although the data line 300 is arranged in a straight line as shown, the data line 300 may be arranged in a bent line such as a zigzag shape without being limited to the straight line.

The thin film transistor TFT is a switching device, and is formed at each of the plurality of pixels P. The thin film transistor TFT includes a gate electrode 210, a semiconductor layer (not shown), a source electrode 300a, and a drain electrode 320.

The gate electrode 210 is protruded from the gate line 200. However, the gate electrode 210 is not limited to such a protrusion structure. For example, without forming a separate protrusion structure, a part of the gate line 200 may function as the gate electrode 210.

The semiconductor layer (not shown) functions as a channel through which electrons move, and is formed between the gate electrode 210 and the source/drain electrodes 300a and 320.

The source electrode 300a is comprised of, but not limited to, a part of the data line 300. For example, the source electrode 300a may be protruded from the data line 300.

The drain electrode 320 facing the source electrode 300a is spaced apart from the source electrode 300a.

The common electrode 400 may be formed on the entire surface of the substrate except for a contact hole CH area. The common electrode 400 may be configured to function as a sensing electrode for sensing a touch of a user. In this case, each of a plurality of common electrodes 400 may be patterned to be spaced apart from each other while having a size corresponding to a predetermined number of pixels P. The common electrode 400 may control an alignment direction of a liquid crystal layer by forming an electric field together with the pixel electrode 600.

The auxiliary line 500 is formed to be in contact with the common electrode 400 and serves to reduce resistance of the common electrode 400. Since the common electrode 400 is formed in a pixel P area, the common electrode 400 is formed of a transparent conductive material that has high resistance. Since the common electrode 400 is formed on the entire surface of the substrate as described above, it is required to reduce resistance. Therefore, the auxiliary line 500 is connected to the common electrode 400 to reduce resistance of the common electrode 400. The auxiliary line 500 is made of a metal material having low resistance. The auxiliary line 500 is formed to overlap the data line 300, thereby preventing an aperture ratio from being deteriorated due to the auxiliary line 500. The auxiliary line 500 is arranged in the second direction equally to the data line 300 while overlapping the data line 300.

Also, if the common electrode 400 is configured to function as the sensing electrode as described above, the auxiliary line 500 may be configured to function as a sensing line that connects the common electrode 400 with the sensing circuit.

The moving stopper walls 550a and 550b serve to prevent the column spacer 800 from moving. When an external force such as pressure by a user's finger is applied to the column spacer 800, the column spacer 800 may move, and at this time, a moving range of the column spacer 800 can be restricted by the moving stopper walls 550a and 550b. In this way, as the moving range of the column spacer 800 is restricted, the alignment direction of the liquid crystals is not changed, whereby a spot defect of the LCD device is avoided.

The moving stopper walls 550a and 550b include a first moving stopper wall 550a and a second moving stopper wall 550b, which are extended to face each other.

The first moving stopper wall 550a and the second moving stopper wall 550b are extended in the first direction parallel to the gate line 200. Particularly, the first moving stopper wall 550a overlaps the gate electrode 210 in a relatively upper position, whereas the second moving stopper wall 550b overlaps the gate line 200 in a relatively lower position. Therefore, the column spacer 800 is arranged between the first moving stopper wall 550a and the second moving stopper wall 550b, whereby the moving range of the column spacer 800 can be restricted by the first moving stopper wall 550a or the second moving stopper wall 550b when the column spacer 800 moves upwardly or downwardly.

The moving stopper walls 550a and 550b may be formed of the same material as that of the auxiliary line 500 on the same layer through the same process. That is, the moving stopper walls 550a and 550b are made of a metal material of which resistance is low, and are in contact with the common electrode 400. Therefore, the moving stopper walls 550a and 550b reduce resistance of the common electrode 400. Since the moving stopper walls 550a and 550b may be formed through the same process as that of the auxiliary line 500, a separate additional process for the moving stopper walls 550a and 550b is not required.

The moving stopper walls 550a and 550b are configured not to be in contact with the auxiliary line 500. The moving stopper walls 550a and 550b may be formed to overlap any one of the data lines 300 overlapping the column spacer 800 and overlap the data lines 300 located at the adjacent left and right sides. Therefore, the moving stopper walls 550a and 550b may be formed to overlap three data lines 300, but not limited to this. Also, the auxiliary line 500 is configured not to overlap the data lines 300 overlapping the moving stopper walls 550a and 550b, whereby the auxiliary line 500 is not in contact with the moving stopper walls 550a and 550b.

As described above, since the moving stopper walls 550a and 550b are formed in an island structure while being not in contact with the auxiliary line 500, an aperture ratio may be reduced by the moving stopper walls 550a and 550b. In more detail, an aperture ratio of the pixel P in which the moving stopper walls 550a and 550b are formed may be reduced by the moving stopper walls 550a and 550b. That is, the aperture ratio of the pixels P in which the moving stopper walls 550a and 550b are formed is smaller than that of the pixels P in which the moving stopper walls 550a and 550b are not formed. In the present disclosure, the aperture ratio of the pixels P means a ratio of an area where light is transmitted, from the entire area of the pixels P. Therefore, if a length of the moving stopper walls 550a and 550b is reduced, the number of the pixels P in which the moving stopper walls 550a and 550b are not formed increases, thereby, the aperture ratio can be improved. In this way, to improve the aperture ratio, the moving stopper walls 550a and 550b are formed to overlap three or less data lines 300.

The pixel electrode 600 is formed in each of the plurality of pixels P. The pixel electrode 600 is connected with the drain electrode 320 of the thin film transistor TFT. The pixel electrode 600 may be formed in finger structures having a plurality of slits. In this case, the alignment direction of the liquid crystal layer may be controlled by a fringe field generated between the pixel electrode 600 of the finger structures and the common electrode 400 of a plate structure.

The column spacer 800 serves to maintain a cell gap between a first substrate and a second substrate. To prevent the aperture ratio from being reduced by the column spacer 800, the column spacer 800 is formed to overlap the data line 300. Also, the column spacer 800 may be formed to overlap the gate electrode 210 as shown. However, as the case may be, the column spacer 800 may be formed to overlap the gate line 200.

Since the moving stopper walls 550a and 550b are formed above and below the column spacer 800, the moving range of the column spacer 800 may be restricted. Each of the pixels P adjacent to the column spacer 800, more specifically, two pixels P at both sides above the column spacer 800 and two pixels P at both sides below the column spacer 800 has an aperture ratio smaller than that of the pixels P which are not adjacent to the column spacer 800. This is because of the moving stopper walls 550a and 550b as described above.

The column spacer 800 arranged between the first moving stopper wall 550a and the second moving stopper wall 550b may be comprised of a main column spacer or an auxiliary column spacer.

The main column spacer is formed to be in contact with each of the first substrate such as a lower substrate and the second substrate such as an upper substrate, and the auxiliary column spacer is in contact with only the second substrate such as the upper substrate without being in contact with the first substrate such as the lower substrate. The main column spacer is formed with the height of a cell gap to serve to maintain a cell gap, and the auxiliary column spacer is formed with the height lower than the cell gap to control the cell gap more effectively when the liquid crystal layer is filled with liquid crystal molecules insufficiently or overfilled with liquid crystal molecules. Also, when an excessive force is applied to the LCD device, the auxiliary column spacer works with the main column spacer to prevent the cell gap from being damaged.

Figure 3:
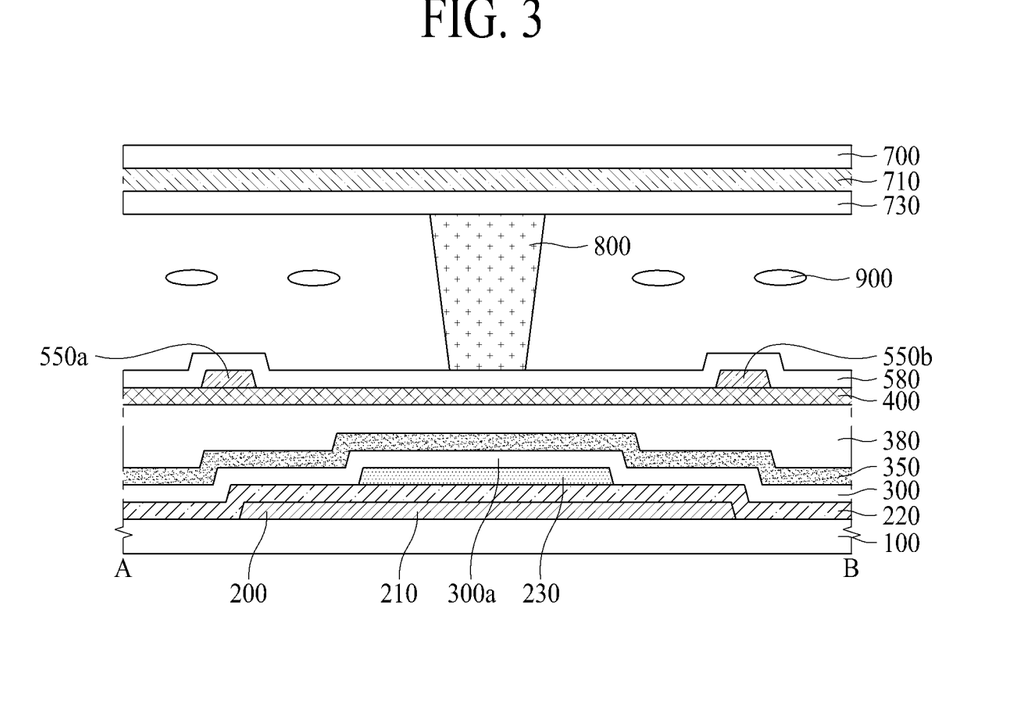
FIG. 3 is a cross-sectional view illustrating an LCD device according to an aspect of the present disclosure, which corresponds to a cross-section of line A-B of FIG. 2.

FIG. 3 is a cross-sectional view illustrating an LCD device according to an aspect of the present disclosure, which corresponds to a cross-section of line A-B of FIG. 2. That is, FIG. 3 is a cross-sectional view illustrating an area of a data line 300 overlapping a column spacer 800.

As shown in FIG. 3, the LCD device according to an aspect of the present disclosure includes a first substrate 100, a second substrate 700, and a column spacer 800 and a liquid crystal layer 900 formed between the first substrate 100 and the second substrate 700.

A gate electrode 210 and a gate line 200 provided in a single body with the gate electrode 210 are formed on one surface of the first substrate 100 which faces the second substrate 700.

A gate insulating film 220 is formed on the gate electrode 210 and the gate line 200, and a semiconductor layer 230 is formed on the gate insulating film 220. The gate insulating film 220 may be made of an inorganic insulating material such as silicon oxide and silicon nitride, and the semiconductor layer 230 may be made of a silicon based semiconductor material or an oxide semiconductor material.

A source electrode 300a and a data line 300 provided in a single body with the source electrode 300a are formed on the semiconductor layer 230.

A passivation layer 350 is formed on the source electrode 300a and the data line 300, and a planarization layer 380 is formed on the passivation layer 350.

The passivation layer 350 may be made of an inorganic insulating material such as silicon oxide or silicon nitride, and the planarization layer 380 may be made of an organic insulating material such as acryl.

A common electrode 400 is formed on the planarization layer 380, and moving stopper walls 550a and 550b are formed on the common electrode 400. The moving stopper walls 550a and 550b are comprised of a first moving stopper wall 550a and a second moving stopper wall 550b which are spaced apart from each other. The first moving stopper wall 550a is overlapped with the gate electrode 210, and the second moving stopper wall 550b is overlapped with the gate line 200.

An inter-layer dielectric (ILD) layer 580 is formed on the moving stopper walls 550a and 550b. The inter-layer dielectric layer 580 may be made of an inorganic insulating material such as silicon oxide and silicon nitride. Although not shown, a pixel electrode is formed on the inter-layer dielectric layer 580, as noted with reference to FIG. 4 which will be described later.

A light-shielding layer 710 is formed on one surface of the second substrate 700 which faces the first substrate 100, and an overcoat layer 730 is formed on the light-shielding layer 710. Although not shown, a color filter is formed between the light-shielding layer 710 and the overcoat layer 730, as noted with reference to FIG. 4 which will be described later.

The column spacer 800 is formed between the first substrate 100 and the second substrate 700. The column spacer 800 is in contact with each of the inter-layer dielectric layer 580 on the first substrate 100 and the overcoat layer 730 on the second substrate 700. Particularly, the column spacer 800 is fixed to the overcoat layer 730 on the second substrate 700, but is not fixed to the inter-layer dielectric layer 580 on the first substrate 100. Therefore, a lower end of the column spacer 800 may move by means of an external force. Meanwhile, an alignment film for initial alignment of liquid crystal molecules is formed on each of the first substrate 100 and the second substrate 700. Therefore, the column spacer 800 is in contact with the alignment films on each of the first substrate 100 and the second substrate 700.

The column spacer 800 is formed in an area between the first moving stopper wall 550a and the second moving stopper wall 550b. That is, the first moving stopper wall 550a is formed at one side of the column spacer 800, and the second moving stopper wall 550b is formed at the other side of the column spacer 800. Therefore, movement of the column spacer 800 can be restricted by the first moving stopper wall 550a and the second moving stopper wall 550b.

The liquid crystal layer 900 is formed between the first substrate 100 and the second substrate 700, and is sealed by a sealant which is not shown.

Figure 4:
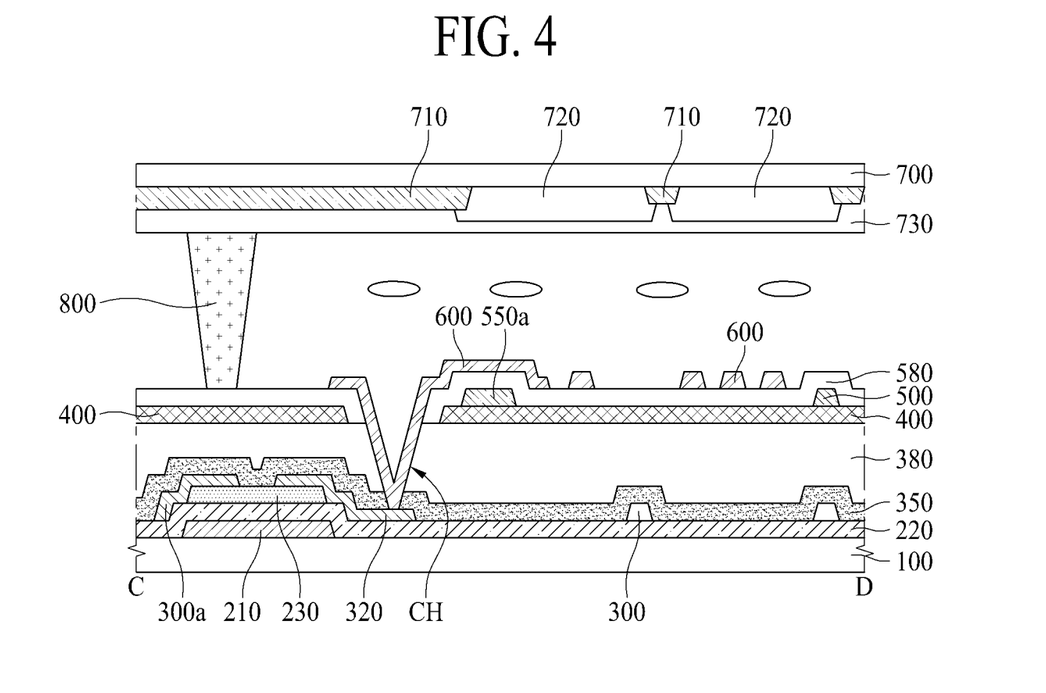
FIG. 4 is a cross-sectional view illustrating an LCD device according to an aspect of the present disclosure, which corresponds to a cross-section of line C-D of FIG. 2.

FIG. 4 is a cross-sectional view illustrating an LCD device according to an aspect of the present disclosure, which corresponds to a cross-section of line C-D of FIG. 2. That is, FIG. 4 illustrates a cross-section of a pixel P area including a thin film transistor T.

As shown in FIG. 4, the LCD device according to an aspect of the present disclosure includes a first substrate 100, a second substrate 700, and a column spacer 800 and a liquid crystal layer 900 formed between the first substrate 100 and the second substrate 700.

A gate electrode 210 is formed on one surface of the first substrate 100 which faces the second substrate 700. A gate insulating film 220 is formed on the gate electrode 210, and a semiconductor layer 230 is formed on the gate insulating film 220.

A source electrode 300a and a drain electrode 320 are formed to be spaced apart from each other on the semiconductor layer 230. Also, a data line 300 is formed on the gate insulating film 220 in the pixel P in which the semiconductor layer 230 is not formed.

A passivation layer 350 is formed on the source electrode 300a, the drain electrode 320 and the data line 300, and a planarization layer 380 is formed on the passivation layer 350.

A common electrode 400 is formed on the planarization layer 380, and moving stopper wall 550a is formed on the common electrode 400. Also, an auxiliary line 500 is formed to be spaced apart from the moving stopper wall 550a on the common electrode. The auxiliary line 500 is formed to overlap the data line 300.

An inter-layer dielectric (ILD) layer 580 is formed on the moving stopper wall 550a and the auxiliary line 500, and a pixel electrode 600 is formed on the inter-layer dielectric layer 580.

A contact hole CH is provided in the passivation layer 350, the planarization layer 380 and the inter-layer dielectric layer 580, the drain electrode 320 is exposed through the contact hole CH, and the pixel electrode 600 is connected with the drain electrode 320 through the contact hole CH. To prevent a short circuit between the pixel electrode 600 and the common electrode 400 when the pixel electrode 600 is extended into the contact hole CH, the common electrode 400 has a hole in the contact hole (CH) area, which is greater than the contact hole CH.

The pixel electrode 600 is patterned to have a plurality of slits. Therefore, a fringe field is formed between the pixel electrode 600 and the common electrode 400 through the slits.

A light-shielding layer 710 is formed to be patterned on one surface of the second substrate 700 which faces the first substrate 100, a color filter 720 is formed to be patterned on the light-shielding layer 710, and an overcoat layer 730 is formed on the color filter 720.

The column spacer 800 is formed between the first substrate 100 and the second substrate 700. Particularly, the column spacer 800 is formed to overlap the source electrode 300a on the first substrate 100.

The liquid crystal layer 900 is formed between the first substrate 100 and the second substrate 700, and its alignment direction is controlled by the fringe field formed between the pixel electrode 600 and the common electrode 400.

Figure 5:
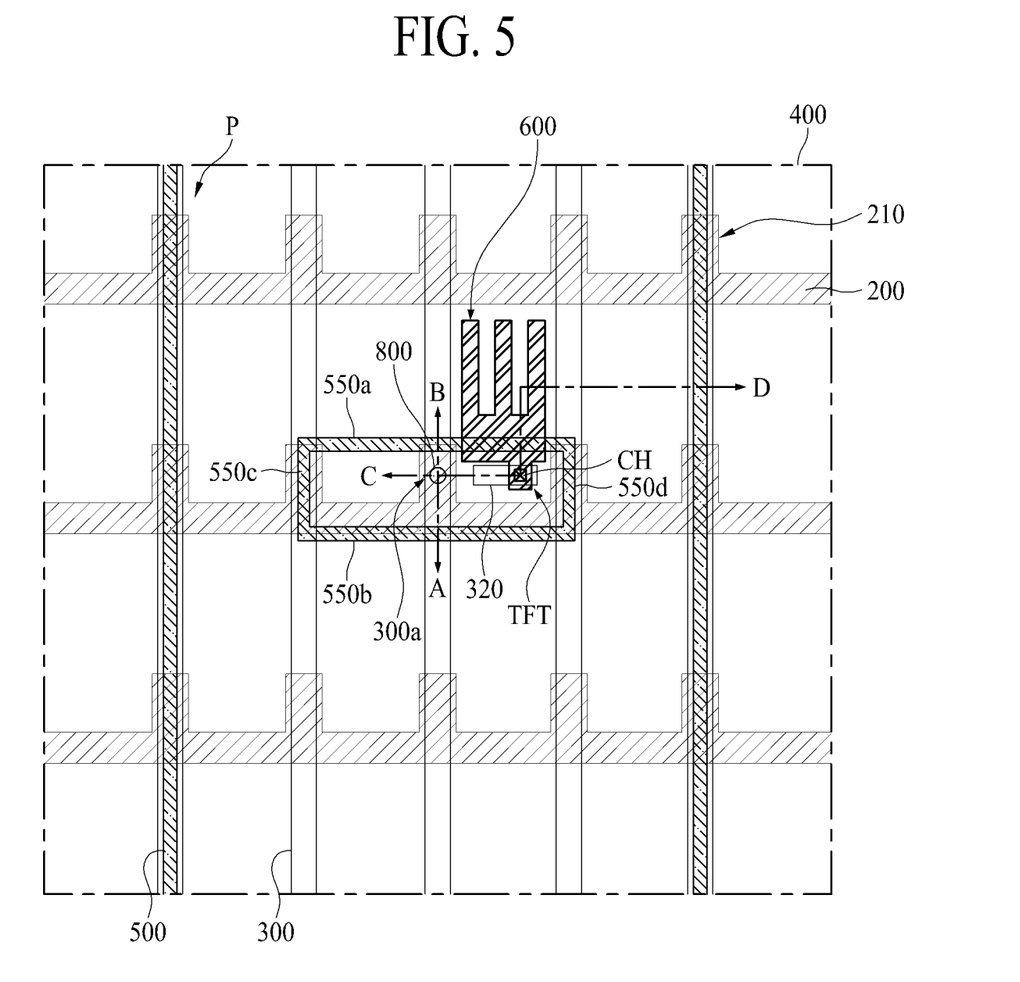
FIG. 5 is a plane view illustrating an LCD device according to another aspect of the present disclosure.

FIG. 5 is a plane view illustrating an LCD device according to another aspect of the present disclosure. The LCD device of FIG. 5 is the same as the aforementioned LCD device of FIG. 2 except for the structures of moving stopper walls 550a, 550b, 550c and 550d. Therefore, the same reference numerals are used to the same elements, and the changed elements will only be described.

According to FIG. 2, the moving stopper walls 550a and 550b are comprised of a first moving stopper wall 550a and a second moving stopper wall 550b, which are arranged in a first direction in parallel with the gate line and spaced apart from each other.

On the other hand, according to FIG. 5, the moving stopper walls 550a and 550b further include a third moving stopper wall 550c and a fourth moving stopper wall 550d, which are arranged in a second direction parallel with the data line 300, in addition to the first moving stopper wall 550a and the second moving stopper wall 550b.

The third moving stopper wall 550c and the fourth moving stopper wall 550c are formed to overlap the data line 300, and therefore it can prevent an aperture ratio from being reduced by the third moving stopper wall 550c and the fourth moving stopper wall 550d. The third moving stopper wall 550c connects one end of the first moving stopper wall 550a with one end of the second moving stopper wall 550b, and the fourth moving stopper wall 550d connects the other end of the first moving stopper wall 550a with the other end of the second moving stopper wall 550b.

Therefore, the moving stopper walls 550a, 550b, 550c and 550d of a rectangular structure are comprised by combination of the first moving stopper wall 550a, the second moving stopper wall 550b, the third moving stopper wall 550c and the fourth moving stopper wall 550d. As a result, the column spacer 800 may be confined inside the moving stopper walls 550a, 550b, 550c and 550d of the rectangular structure, whereby movement of the column spacer 800 in an up and down direction and a left and right direction can be restricted. In this case, the moving stopper walls 550a, 550b, 550c and 550d are spaced apart from the auxiliary line 500.

Figure 6:
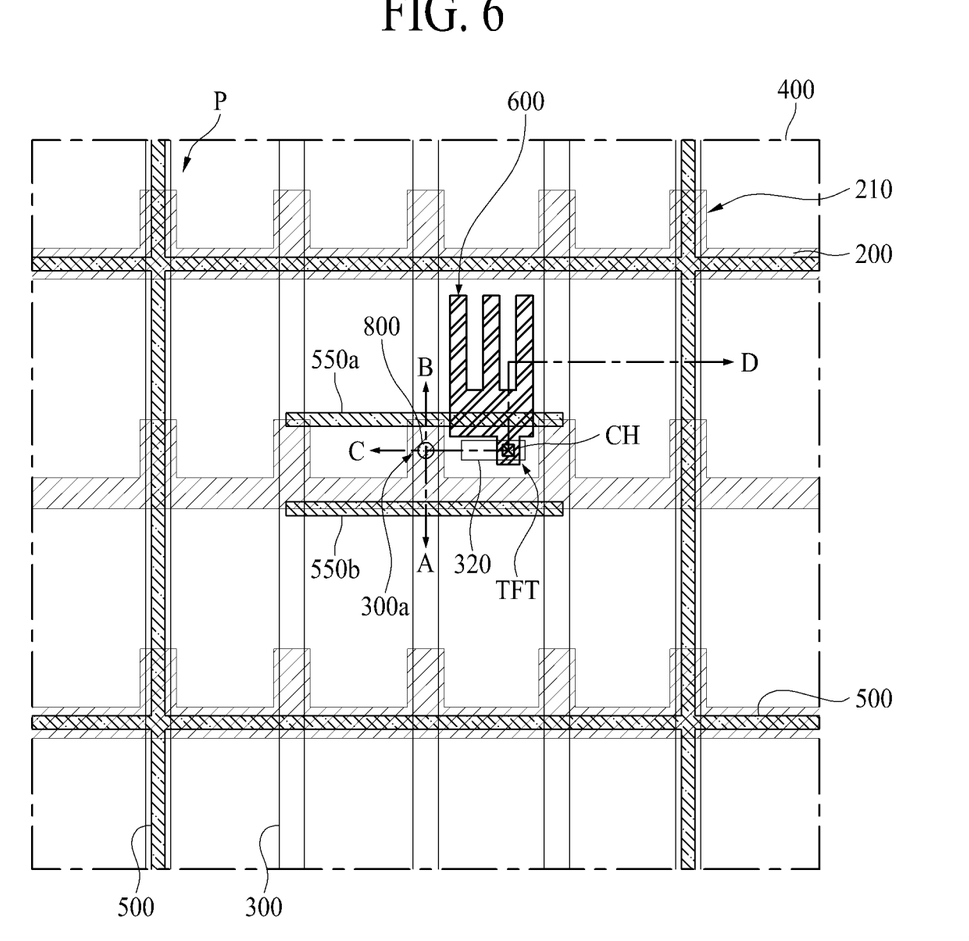
FIG. 6 is a plane view illustrating an LCD device according to still another aspect of the present disclosure.

FIG. 6 is a plane view illustrating an LCD device according to still another aspect of the present disclosure. The LCD device of FIG. 6 is the same as the aforementioned LCD device of FIG. 2 except that the auxiliary line 500 is changed. Therefore, the same reference numerals are used to the same elements, and the changed element will only be described.

According to FIG. 2, the auxiliary line 500 is arranged in the second direction parallel with the data line 300 while overlapping the data line 300.

On the other hand, according to FIG. 6, the auxiliary line 500 is arranged in the first direction and the second direction while overlapping the data line 300 and the gate line 200. Therefore, resistance of the common electrode 400 may be more reduced. Even in this case, the auxiliary line 500 is spaced apart from the moving stopper walls 550a and 550b.

Also, although not shown, the moving stopper walls 550a, 550b, 550c and 550d in accordance with FIG. 5 can be applied to the structure of FIG. 6.

According to the present disclosure described as above, the following advantages may be obtained.

According to an aspect of the present disclosure, as the moving stopper walls are provided, the moving range of the column spacer may be restricted. Therefore, the alignment direction of the liquid crystal layer is not changed by the movement of the column spacer, whereby a spot defect of the LCD device can be avoided.

It will be apparent to those skilled in the art that various modifications and variations can be made in the present disclosure without departing from the spirit or scope of the disclosures. Thus, it is intended that the present disclosure covers the modifications and variations of this disclosure provided they come within the scope of the appended claims and their equivalents.

What is claimed is:

1. A liquid crystal display (LCD) device comprising:
 a first substrate and a second substrate;
 gate and data lines provided on the first substrate and arranged to cross each other defining a plurality of pixels;
 a pixel electrode provided in each of the plurality of pixels on the first substrate;
 a common electrode provided over the first substrate to form an electric field together with the pixel electrode;
 auxiliary lines connected to the common electrode to reduce an electrical resistance of the common electrode and formed of a material different from the common electrode;
 a column spacer provided between the first substrate and the second substrate to maintain a cell gap; and
 moving stopper walls provided on the first substrate to restrict a moving range of the column spacer,
 wherein the moving stopper walls are spaced apart from the auxiliary lines and disposed between the auxiliary lines, and the moving stopper walls and the auxiliary lines do not vertically overlap each other, and
 wherein the moving stopper walls and the auxiliary lines are disposed on the common electrode without intervening layers in a vertical direction.

2. The LCD device of claim 1, wherein the moving stopper walls are provided on the same layer as the auxiliary lines and made of the same material as that of the auxiliary lines.

3. The LCD device of claim 1, wherein the moving stopper walls are disposed to intersect three adjacent data lines.

4. The LCD device of claim 1, wherein the moving stopper walls include a first moving stopper wall and a second moving stopper wall, which are extended in a first direction and spaced apart from each other.

5. The LCD device of claim 4, wherein the column spacer is provided between the first moving stopper wall and the second moving stopper wall.

6. The LCD device of claim 4, further comprising a gate electrode provided on the first substrate and extended from the gate line, wherein the first moving stopper wall overlaps the gate electrode and the second moving stopper wall overlaps the gate line.

7. The LCD device of claim 4, wherein the first moving stopper wall and the second moving stopper wall are extended in the same direction as the gate line, and the auxiliary line is extended in the same direction as the data line.

8. The LCD device of claim 4, wherein the moving stopper walls include a third moving stopper wall and a fourth moving stopper wall, which are extended in a second direction, and the third moving stopper wall connects one end of the first moving stopper wall with one end of the second moving stopper wall and the fourth moving stopper wall connects the other end of the first moving stopper wall with the other end of the second moving stopper wall.

9. The LCD device of claim 8, wherein the third moving stopper wall and the fourth moving stopper wall are extended in the same direction as the data line while overlapping the data line.

10. The LCD device of claim 8, wherein the column spacer is provided within a rectangular structure formed by combination of the first moving stopper wall, the second moving stopper wall, the third moving stopper wall and the fourth moving stopper wall.

11. The LCD device of claim 1, wherein each pixel provided with the moving stopper walls has an aperture ratio smaller than that of each pixel which is not provided with the moving stopper walls.

12. The LCD device of claim 1, wherein each pixel adjacent to the column spacer has an aperture ratio smaller than that of each pixel which is not adjacent to the column spacer.

13. The LCD device of claim 1, wherein the auxiliary line is provided to overlap each of the gate line and the data line.

14. A liquid display device, comprising:
first and second substrates facing each other;
a thin film transistor on the first substrate;
a planarization layer over the first substrate including the thin film transistor, the planarization layer having a contact hole;
a common electrode on planarization layer and having a disconnected portion at the contact hole of the planarization layer;
auxiliary lines on the common electrode reducing an electrical resistance of the common electrode and formed of a material different from the common electrode;
a pixel electrode in the contact hole of the planarization layer, the pixel electrode spaced apart from the common electrode;
a column spacer between the first substrate and the second substrate maintaining a cell gap; and
first and second column spacer moving stopper walls in parallel with each other on the common electrode and preventing damage on an alignment direction of liquid crystal molecules,
wherein the first and second column spacer moving stopper walls are spaced apart from the auxiliary lines and disposed between the auxiliary lines, and the first and second moving stopper walls and the auxiliary lines do not vertically overlap each other, and
wherein the moving stopper walls and the auxiliary lines are disposed on the common electrode without intervening layers in a vertical direction.

15. The liquid display device of claim 14, wherein the first and second moving stopper walls are formed of the same material as the auxiliary lines.

16. The liquid display device of claim 14, wherein the column spacer is disposed between the first column spacer moving stopper wall and the second column spacer moving stopper wall.

17. The liquid display device of claim 14, further comprising third and fourth column spacer moving stopper walls in parallel with each other on the common electrode.

18. The liquid display device of claim 17, wherein the first, second, third and fourth column spacer moving stopper walls are connected to form a rectangular shape.

19. The liquid display device of claim 18, wherein the column spacer is disposed within the rectangular shape formed by the first, second, third and fourth column spacer moving stopper walls.

20. The liquid display device of claim 14, wherein the first and second column spacer moving stopper walls are surrounded by the auxiliary lines.

* * * * *